No. 896,125. PATENTED AUG. 18, 1908.
E. LOMMATZSCH.
LAUNDRY WASHING MACHINE.
APPLICATION FILED MAY 5, 1906.

Witnesses
A. J. Hadden
A. E. Hathaway

Inventor
Ernst Lommatzsch
By R. Hadden
Attorney

UNITED STATES PATENT OFFICE.

ERNST LOMMATZSCH, OF BÖSDORF, GERMANY.

LAUNDRY WASHING-MACHINE.

No. 896,125.

Specification of Letters Patent.

Patented Aug. 18, 1908.

Application filed May 5, 1906. Serial No. 315,429.

*To all whom it may concern:*

Be it known that I, ERNST LOMMATZSCH, a subject of the King of Saxony, residing at Bösdorf, Saxony, Germany, have invented certain new and useful Improvements in Laundry Washing-Machines, of which the following is a specification.

This invention relates to improvements in laundry washing-machines with concentric drums or cylinders.

The washing-machines hitherto known with concentric drums adapted to be used also for hydro-extracting purposes have the important disadvantage that the axles or journals of the drums, and the bearings thereof, are subject to very rapid wear; moreover, the oil required for lubricating the said bearings is liable to come into contact with the washing-liquid, and centrifugal work at high speed is rendered impracticable even by slight wear of the bearings and axles, owing to the unsteady action which results from such wear. These disadvantages result from the fact that the two concentric drums, that is to say the inner drum for the reception of the clothes or the like and the outer drum for the reception of the liquid, have hitherto been so arranged that they are inter-connected, the inner drum having bearings in the outer drum by means of stuffing-boxes and journals. The said bearings are, therefore, in contact with the washing-liquid, so that the latter is soiled by the lubricant, and the bearings and axles are worn out by the heat and friction due to the removal of the said lubricant from the parts to which it is applied.

The object of the present invention is to remove these disadvantages by arranging the bearings of the inner drum in such a manner that they do not come into contact with the outer drum for the reception of the liquid.

Figure 1:
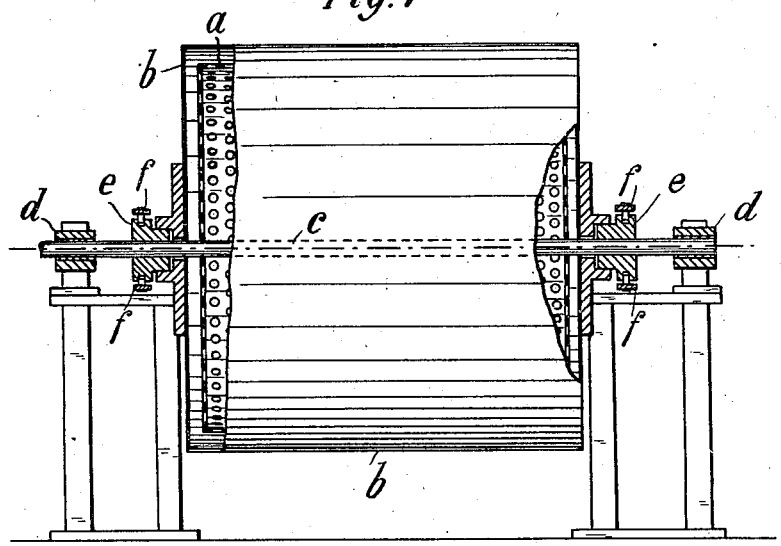
Figure 2:
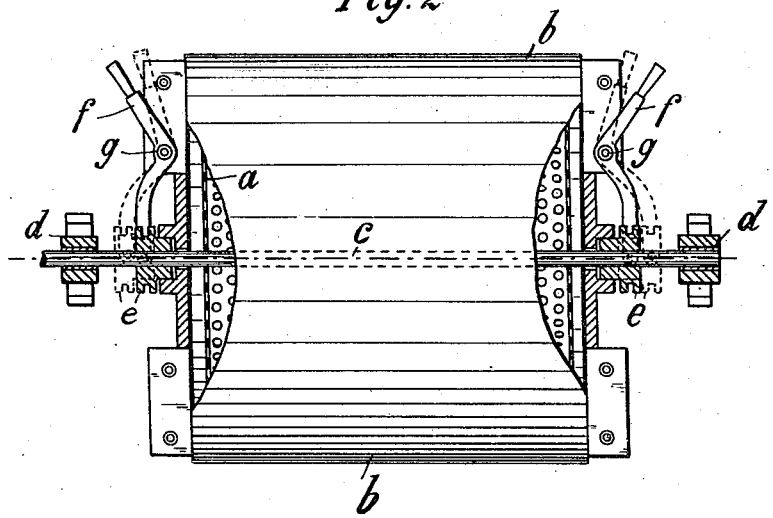

The invention is illustrated in the annexed drawing, Figure 1 being a sectional elevation and Fig. 2 a sectional plan of a washing drum provided with the present invention.

The washing-machine comprises the stationary external drum $b$ for the reception of the washing-liquid, and the rotary internal drum $a$ for the reception of the clothes, the drum $a$ being concentric with the drum $b$ and fixed to the rotatable axle or shaft $c$. The latter is supported by bearings $d$ located outside the drum $b$. The shaft $c$ is not in contact with the drum $b$, but freely supported within same and the washing liquid does not impinge on the bearings $d$, so that excessive friction due to the removal of the lubricant is prevented, and the internal drum can be driven at high speed for hydro extracting purposes, without oscillation or jolting resulting from worn bearings.

To prevent the discharge of liquid and steam from the external drum during the washing process, slidable sleeves $e$ are arranged on the shaft $c$. During the washing operation these sleeves, which can be displaced by means of levers $f$ pivoted at $g$, are pressed against the end covers of the drum $b$, as shown in Fig. 2.

After the washing operation the sleeves can be moved into the positions clear of the drum $b$ by means of said levers $f$, as shown in dotted lines in Fig. 2 so that there is no frictional contact between the sleeves and the outer drum when the inner drum is being rapidly rotated for hydro-extraction, and the sleeves can rotate with the shaft of the inner drum.

I am aware that it has been previously proposed to use washing machines in which the axle of the inner cylinder is supported on external bearings and passes through glands in the outer cylinder and no claim *per se* is made to these features, but

What I claim as my invention and desire to secure by Letters Patent of the United States is:—

1. In a laundry washing machine the combination of a fixed outer drum for containing liquid and having centrally disposed apertures in its end walls, a rotary interior drum for reception of the articles to be treated, a shaft carrying said interior drum and passing freely through the apertures in the outer drum, bearings for said shaft exteriorly of said drums and manually operable means slidable on the shaft for closing the apertures aforesaid substantially as described.

2. In a laundry washing machine the combination of a fixed outer drum for containing liquid and having centrally disposed apertures in its end walls, a rotary interior drum for reception of the articles to be treated, a shaft carrying said interior drum and passing freely through the apertures in the outer drum, bearings for said shaft exteriorly of said drums, sleeves slidably mounted on said shaft adapted to close the apertures aforesaid and manually operable levers for sliding said sleeves on the shaft substantially as described.

In witness whereof I have signed this specification in the presence of two witnesses.

ERNST LOMMATZSCH.

Witnesses:
ERNST AUGER,
WM. HEFFTER.